United States Patent
Sugiura

(10) Patent No.: US 7,248,987 B2
(45) Date of Patent: Jul. 24, 2007

(54) SIGNAL PROCESSING SYSTEM FOR SENSOR

(75) Inventor: Takehiko Sugiura, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/229,493

(22) Filed: Sep. 20, 2005

(65) Prior Publication Data

US 2006/0064267 A1    Mar. 23, 2006

(30) Foreign Application Priority Data

Sep. 21, 2004 (JP) ............................. 2004-272918

(51) Int. Cl.
*G06F 16/00* (2006.01)

(52) U.S. Cl. ................... 702/117; 702/32; 702/66; 702/67; 702/70; 702/116; 702/124; 702/126

(58) Field of Classification Search ............. 702/117, 702/32, 66, 67, 70, 116, 124, 126; 83/74
See application file for complete search history.

(56) References Cited

U.S. PATENT DOCUMENTS 4,274,317 A * 6/1981 Vulliens ..................... 83/74
6,021,991 A * 2/2000 Mayama et al. ........... 248/550

FOREIGN PATENT DOCUMENTS

JP    2003-106048    4/2003

* cited by examiner

*Primary Examiner*—Carol S. W. Tsai
*Assistant Examiner*—Phuong Huynh
(74) *Attorney, Agent, or Firm*—Buchanan Ingersoll & Rooney PC

(57) ABSTRACT

A signal processing system for a sensor for judging whether an event to be detected has occurred on the basis of a frequency of a sensor output includes a converting device for converting the sensor output into a square wave, a presuming device for presuming whether the frequency of the sensor output is lower than a predetermined frequency referred for judging whether the event to be detected has occurred on the basis of an output from the converting device, and a judging device for judging whether the event to be detected has occurred on the basis of an output from the presuming device.

10 Claims, 7 Drawing Sheets

SIGNAL PROCESSING SYSTEM FOR SENSOR

CROSS REFERENCE TO RELATED APPLICATIONS

This application is based on and claims priority under 35 U.S.C. § 119 with respect to Japanese Patent Application 2004-272918, filed on Sep. 21, 2004, the entire content of which is incorporated herein by reference.

FIELD OF THE INVENTION

The present invention relates to a signal processing system for a sensor. More specifically, the present invention pertains to a signal processing system for a sensor for judging whether an event to be detected has occurred on the basis of a frequency of a sensor output.

BACKGROUND

As an example of a conventional signal processing system for a sensor for judging an event to be detected on the basis of a frequency of a sensor output, a piezoelectric sensor system, which detects force generated by shock or oscillation and outputs voltage signal, is known. The piezoelectric sensor system can be employed for a pinch-detection apparatus for an electric opening/closing apparatus which opens/closes a slide door with a motor or the like, such as an automatic door of a building, an electric slide door for a vehicle such as a wagon and a van.

Piezoelectric element generates electric polarization in accordance with external force (stress). The piezoelectric sensor utilizing the piezoelectric element outputs an oscillating voltage signal such as a sinusoidal wave generated by electric polarization in accordance with external force applied when an object is pinched by the opening/closing door or the like. Not only a pinch, but also an vibration or the like, induces voltage output. However, because of difference in frequencies of the voltage waveforms, an event to be detected (in this case, pinch of an object) can preferably be identified. Further, because the piezoelectric sensor starts generating voltage at an early stage of pinch, in which external force is weak, pinch can be detected at the beginning of the event. Accordingly, a countermeasure can be conducted against the pinch before large force is applied to the pinched object JP2003-106048A. describes a pressure sensitive sensor utilizing such a piezoelectric sensor applied to a hatchback door for a vehicle.

However, as described in JP2003-106048A, the frequency of the voltage output transmitted when the pinch is detected is extremely low, approximately 10 Hz or less. Accordingly, measuring the waveform during one cycle of a time period for determining the frequency takes inverse number of frequency, in other words, 100 milisecond or more. In the pressure sensitive sensor described above, advantages of a highly sensitive piezoelectric sensor, which can conduct detection of early stage of pinch, are not satisfactorily utilized A need thus exists for a signal processing system for a sensor for analyzing a sensor output in a short time and for judging whether an event to be detected has occurred on the basis of a frequency of the sensor output.

SUMMARY OF THE INVENTION

According to an aspect of the present invention, a signal processing system for a sensor for judging whether an event to be detected has occurred on the basis of a frequency of a sensor output includes a converting means for converting the sensor output into a square wave, a presuming means for presuming whether the frequency of the sensor output is lower than a predetermined frequency referred for judging whether the event to be detected has occurred on the basis of an output from the converting means, and a judging means for judging whether the event to be detected has occurred on the basis of an output from the presuming means.

According to a further aspect of the present invention, a signal processing system for a sensor for judging whether an event to be detected has occurred on the basis of a frequency of a sensor output includes a converting means for converting the sensor output into a square wave, an accentuating means for accentuating a peak portion of the sensor output, a determining means for determining the frequency of the sensor output on the basis of outputs from the converting means and the accentuating means and for determining whether the frequency of the sensor output is lower than a predetermined frequency referred for judging whether the event to be detected has occurred, and a judging means for judging whether the event to be detected has occurred on the basis of an output from the determining means.

According to a further aspect of the present invention, a signal processing system for a sensor for judging whether an event to be detected has occurred on the basis of a frequency of a sensor output includes a converting means for converting the sensor output into a square wave, a presuming means for presuming whether the frequency of the sensor output is lower than a predetermined frequency referred for judging whether the event to be detected has occurred on the basis of an output from the converting means, an accentuating means for accentuating a peak portion of the sensor output, a determining means for determining the frequency of the sensor output on the basis of outputs from the converting means and the accentuating means and for determining whether the frequency of the sensor output is lower than a predetermined frequency referred for judging whether the event to be detected has occurred, and a judging means for judging whether the event to be detected has occurred on the basis of outputs from the presuming means and the judging means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
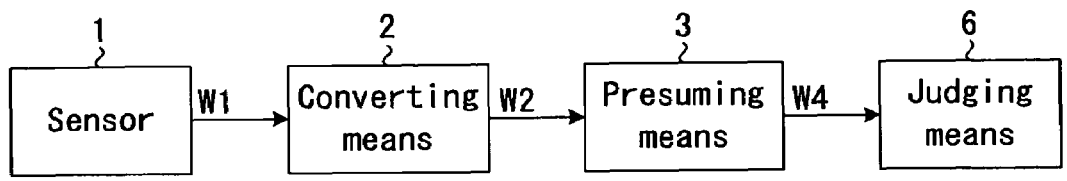
FIG. 1 represents a block diagram illustrating a first configuration example of a signal processing system for a sensor according to the embodiment of the present invention.
Figure 2:
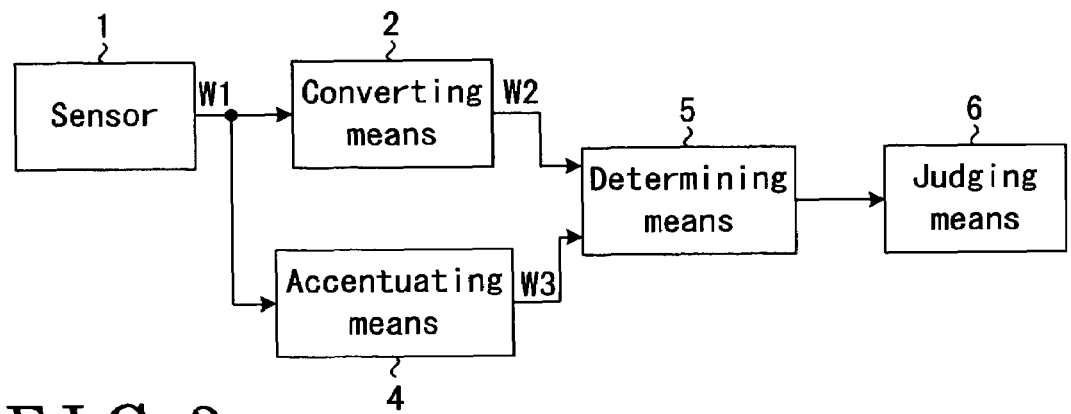
FIG. 2 represents a block diagram illustrating a second configuration example of a signal processing system for a sensor according to the embodiment of the present invention.
Figure 3:
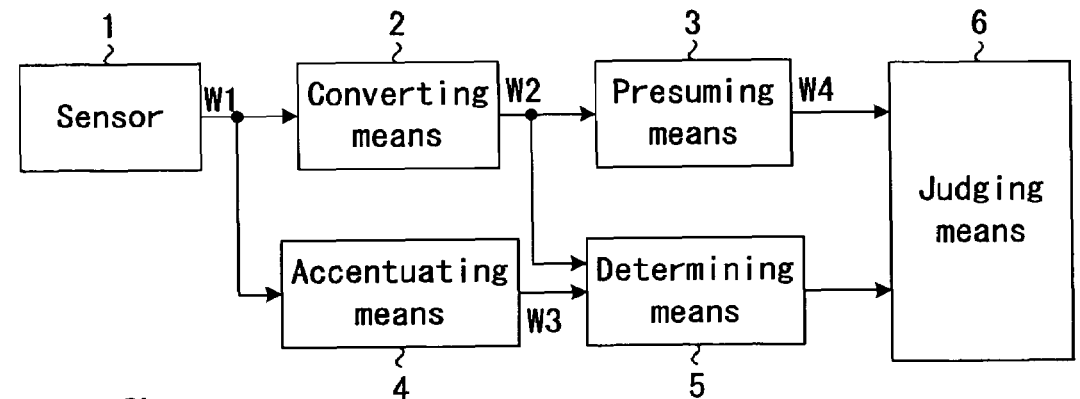
FIG. 3 represents a block diagram illustrating a third configuration example of a signal processing system for a sensor according to the embodiment of the present invention.

An embodiment of the present invention will be explained with reference to drawing figures. FIGS. 1 to 3 represent block diagrams illustrating configuration examples of a signal processing system for a sensor according to the embodiment of the present invention. The signal processing system for a sensor illustrated in FIGS. 1 to 3 judges whether an event to be detected has been occurred on the basis of a frequency of a sensor output W1. Here, an event to be detected includes various events such that an object is detected by a optical sensor or that oscillation or shock applied by an object is detected by a piezoelectric sensor.

The signal processing system for a sensor according to a first configuration example illustrated in FIG. 1 includes a converting means 2 for converting a sensor output W1 transmitted from a sensor 1 into a square wave (waveform W2), a presuming means 3 for presuming whether a frequency of the sensor output W1 is lower than a predetermined frequency determined for judging whether an event to be detected has occurred on the basis of the output transmitted from the converting means 2 (waveform W2), and a judging means 6 for judging whether the event to be detected has occurred on the basis of the output from the presuming means 3.

The signal processing system for a sensor according to a second configuration example illustrated in FIG. 2 includes a converting means 2 for converting a sensor output W1 transmitted from a sensor 1 into a square wave (waveform W2), an accentuating means 4 for accentuating a peak portion of the sensor output W1, and a determining means 5 for determining a frequency of the sensor output W1 on the basis of an output from the converting means 2 and the accentuating means 4 and determining whether a frequency of the sensor output W1 is lower than a predetermined frequency determined for judging whether an event to be detected has occurred, and a judging means 6 for judging whether the event to be detected has occurred on the basis of an output of the determining means 5.

The signal processing system for a sensor according to a third configuration example illustrated in FIG. 3 includes a converting means 2 for converting a sensor output W1 transmitted from a sensor 1 into a square wave (waveform W2), a presuming means 3 for presuming whether a frequency of the sensor output W1 is lower than a predetermined frequency determined for judging whether an event to be detected has occurred on the basis of an output transmitted from the converting means 2 (waveform W2), an accentuating means 4 for accentuating a peak portion of the sensor output W1, a determining means 5 for determining whether the frequency of the sensor output W1 is lower than a predetermined frequency determined for judging whether the event to be detected has occurred on the basis of outputs from the converting means 2 and the accentuating means 4, and a judging means 6 for judging whether the event to be detected has occurred on the basis of outputs from the presuming means 3 and the determining means 5.

Figure 4:
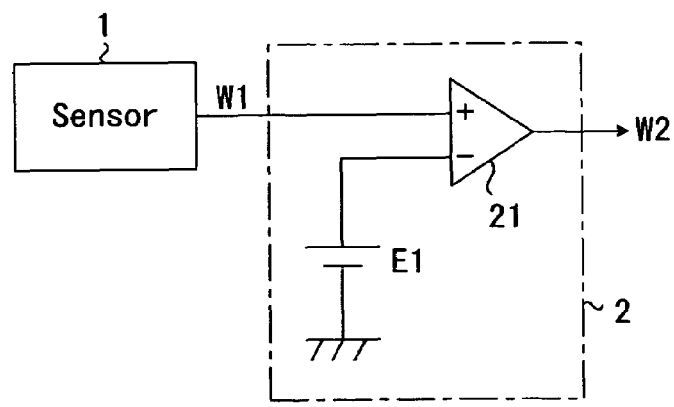
FIG. 4 represents a diagram illustrating an example of a circuit configuration of a converting means according to the first to third configuration examples.
Figure 5:
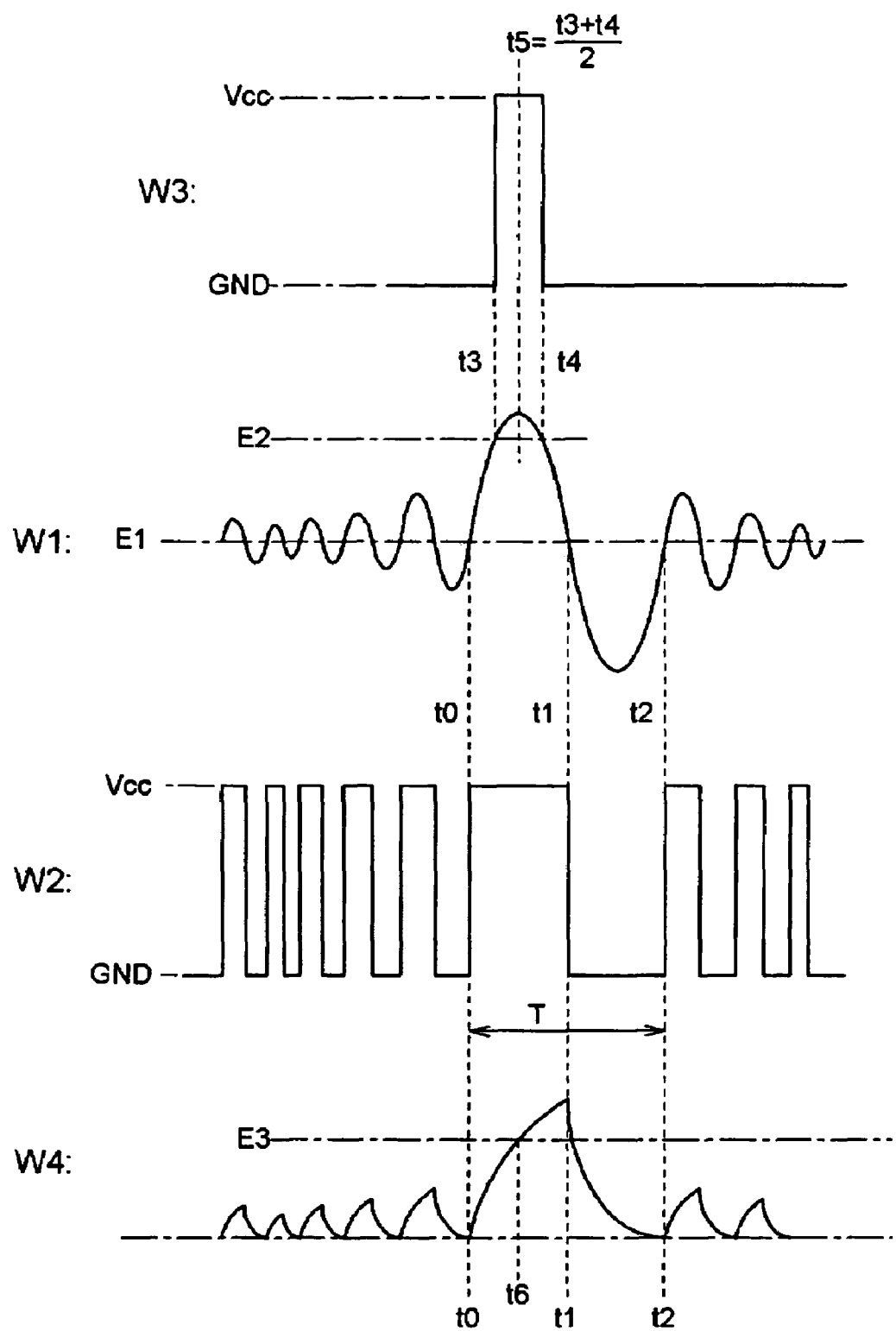
FIG. 5 represents a waveform chart for explaining a signal processing according to the first to third configuration examples.

In following, details of each means included in each configuration example will be explained. Unless otherwise noted, the details of from the first configuration example to the third configuration example are integrally explained as an embodiment First, the converting means 2 will be explained with reference to drawing figures. FIG. 4 represents a diagram illustrating a configuration example of the converting means 2 described in from the first configuration example to the third configuration example. FIG. 5 represents a waveform chart illustrating a signal processing performed in from the first configuration example to the third configuration example. In FIG. 5, a sinusoidal waveform is displayed as an example of a sensor output of a cyclic oscillation. As illustrated in FIG. 5, in the sensor output W1 of a sinusoidal wave transmitted from the sensor 1, the part of the sinusoidal wave having largest amplitude illustrated in the figure indicates a waveform when the event to be detected is detected. The part of the wave of smaller amplitude and shorter period lying backward and forward of the part of the largest amplitude wave described above indicates an output not owing to the event to be detected. Such signals not owing to the event to be detected, in other words, noise elements, are normally included in the output of the sensor 1. Accordingly, generally, a signal input portion, into which a signal is transmitted from the sensor 1, is provided a filter circuit for reducing noise elements or an amplification circuit of low gain, in other words, an initial amplifier is frequently provided at front circuitry. In the embodiment, the signal input portion is omitted in order to simplify explanation. When the signal input portion is added to the embodiment, the signal input portion is connected between the sensor 1 and the converting means 2. Then, a waveform of the sensor output W1 is transmitted to the converting means 2 through the signal input portion. It has been mentioned that the signal input portion includes a filter for reducing noise elements. However, it is needless to say that the filter cannot eliminate all of the noise elements. Some of noise elements are remained in the signals transmitted to the converting means 2. In other words, signals processed in the converting means 2 includes another signal elements as that illustrated in FIG. 5. Accordingly, for simplicity, the converting means 2 can be considered as such a configuration illustrated in FIG. 4.

As illustrated in FIG. 4, the converting means 2 is configured from a comparator utilizing an operational amplifier 21. A threshold voltage of the comparator is set to a voltage E1. As illustrated in FIG. 5, the threshold voltage is equivalent to an amplitude center of the sensor output voltage W1. Accordingly, the sensor output W1 of a sinusoidal wave is converted into a square wave (waveform W2) having a duty ratio of approximately 1:1 by means of the comparator of the converting means 2 having the threshold voltage E1. The square wave converted from the waveform of the sensor output W1 oscillates between ground (GND) and a source voltage Vcc independent from the amplitude of the sensor output W1. In addition, the voltage E1 is determined on the basis of a voltage divided by resistors, a Zener diode, or the like. Then, an output of a constant voltage circuit such as an emitter follower or a voltage follower or the like is utilized for avoiding voltage drop caused by current flow in the circuit. Threshold voltages E2 and E3, utilized in some means referred later, are determined in similar way.

Next, the presuming means will be explained with reference to drawing figures. As illustrated in FIG. 5, time duration T from the time t0, when the pulsed square wave of the waveform W2 rises, to the time t2, when the pulsed square wave of the waveform W2 rises again, can be considered as a cycle of the sensor output W1. Further, a frequency of the sensor output W1 can be considered as an inverse number of the time period. Accordingly, the time period T (one cycle of the pulsed square wave of the waveform W2) can be measured by means of inputting the signal of the waveform W2 into an edge detector such as a flip flop, a multi vibrator or the like, a time measurement circuit in which a timer and the like are combined together, microcomputer or the like. The time measurement circuit can be the presuming means 3 in the embodiment. However, in this case, time duration longer than one cycle of the signal of the waveform W2 is necessary for measuring the frequency (time period) of the sensor output W1. Accordingly, in this embodiment, the presuming means 3 employs another configuration, which enables to measure the frequency (time period) within shorter time.

Figure 6:
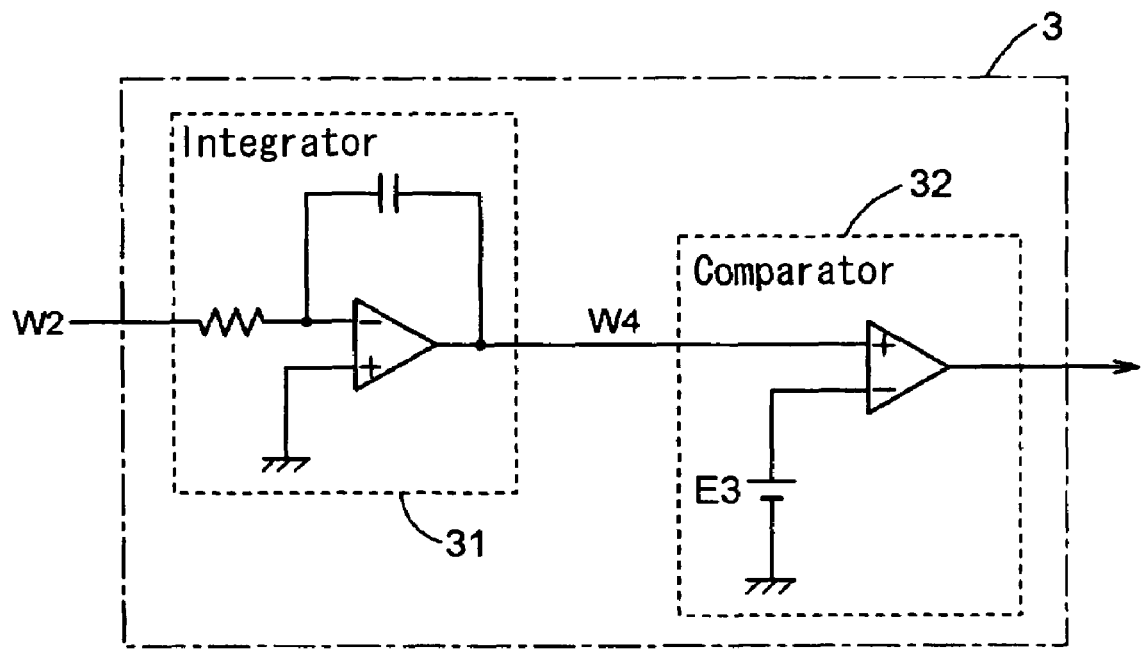
FIG. 6 represents a diagram illustrating an example of a circuit configuration of a presuming means according to the first to third configuration examples.

FIG. 6 represents a diagram illustrating an example of a circuit configuration of the presuming means 3 employed in the first configuration example and the third configuration example. As illustrated in FIG. 6, the presuming means 3 in the embodiment (employed in the first and third configuration examples) includes an integrator 31 for gradually transiting the output of the converting means 2 of the square wave (waveform W2) in accordance with a time constant determined on the basis of a predetermined frequency determined for judging whether the event to be detected has occurred and a comparator 32 having a threshold voltage E3 determined so that the output waveform of the integrator 31 (waveform W4 illustrated in FIG. 5) can exceed the threshold voltage E3 by the time when the waveform W4 reaches its peak in the case that the frequency of the sensor output is lower than the predetermined frequency. Each of the integrator 31 and the comparator 32 is configured from an operational amplifier. However, it is not limited. For example, the integrator 31 can be configured as an integration circuit in which a resistor, a capacitor, and an inductor are combined together.

As illustrated in FIG. 5, at the time t0 when a pulse of the square wave of the waveform W2 rises, charge of a capacitor of the integrator 31 is started. In accordance with that, the waveform W4 indicating the output voltage of the integrator 31 starts rising. Then, the output voltage of the integrator 31 indicated by the waveform W4 keeps rising gradually as the capacitor is charged. Then, at the time t1 when the pulse of the square wave of the waveform W2 falls, discharge of the capacitor is started. In accordance with that, the output voltage of the integrator 31 starts going down, and keeps going down gradually as the capacitor is discharged. Times required for these charging and discharging are determined on the basis of a time constant determined by constants of a resistor and the capacitor included in the integrator 31. As can be seen from the waveform W4, in a low frequency portion of the waveform W4, the output voltage of the integrator 31 exceeds the threshold voltage E3 at the time t6. On the other hand, in a high frequency portion of the waveform W4, the output voltage of the integrator 31 cannot exceed the threshold voltage E3. In other words, the pulse of the detection output, in relation to the event to be detected having low frequency, can be charged sufficiently in a long time. On the other hand, because the pulse of high frequency does not have enough time for charging, discharge is started before completion of charging. Accordingly, determining an appropriate time constant, can be set a length of time period required for the output of the integrator 31 to exceed the threshold voltage E3. Then, considering whether the waveform W4 exceeds the threshold voltage E3 can presume whether a frequency of the sensor output (waveform W1) is lower than a predetermined frequency.

Figure 7:
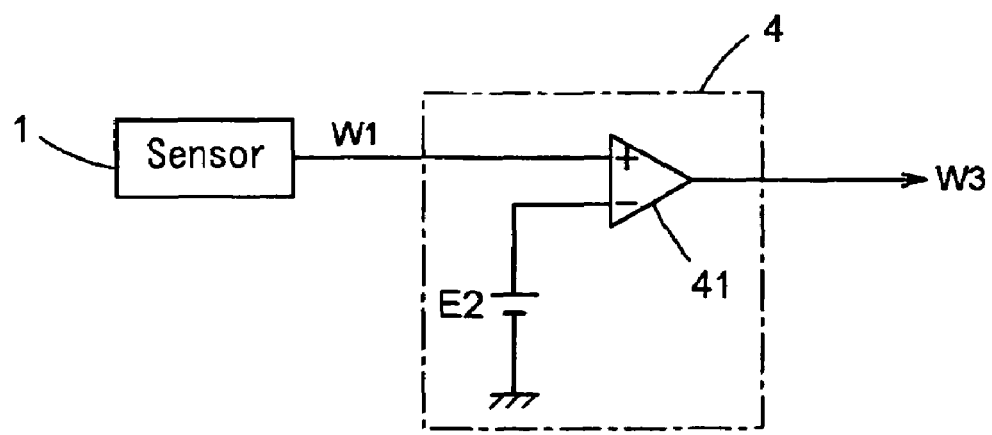
FIG. 7 represents a diagram illustrating an example of a circuit configuration of an accentuating means according to the second and third configuration examples.

Next, the accentuating means will be explained with reference to drawing figures. FIG. 7 represents a diagram illustrating an example of circuit configuration of the accentuating means 4 employed in the second and third configuration examples. As illustrated in FIG. 7, the accentuating means 4 is configured from a comparator in which an operational amplifier 41 for converting the sensor output (waveform W1) around the peak portion into a narrower pulse (waveform W3) is utilized. As illustrated in FIG. 5, the threshold of the comparator 41 is set to voltage E2 higher than the voltage E1, which is an amplitude center of the sensor output W1 of the sinusoidal wave. Thus, the sensor output (waveform W1) around the peak portion is converted into a narrower pulse (waveform W3). In other words, while the converting means 2 generates a pulse rising at the time t0 and falling at the time t1, the accentuating means 4 generates a pulse rising at the time t3 (later than the time t0) and falling at the time t4 (earlier than the time t1). In other words, the accentuating means 4 accentuates or detects the peak of the sensor output (waveform W1) of the sinusoidal wave.

Figure 8:
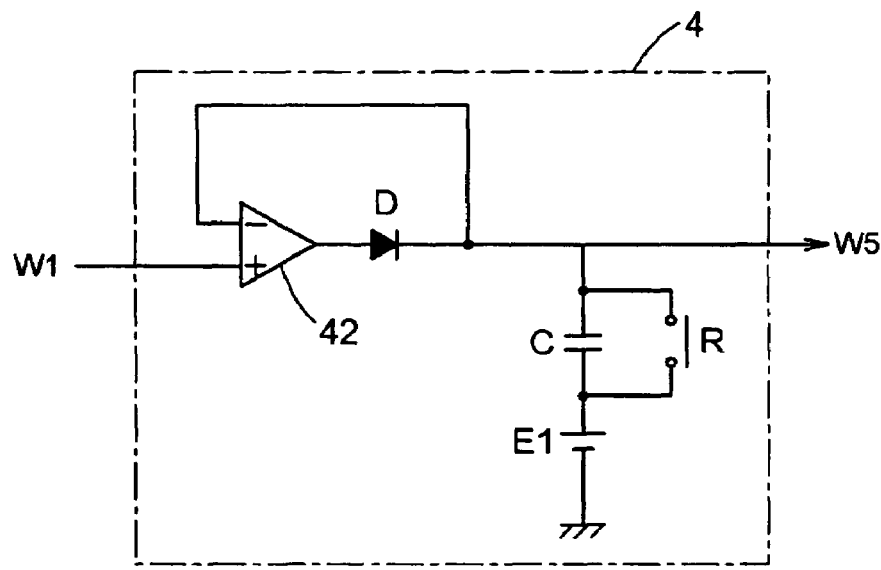
FIG. 8 represents a diagram illustrating another example of a circuit configuration of the accentuating means according to the second and third configuration examples.
Figure 9:
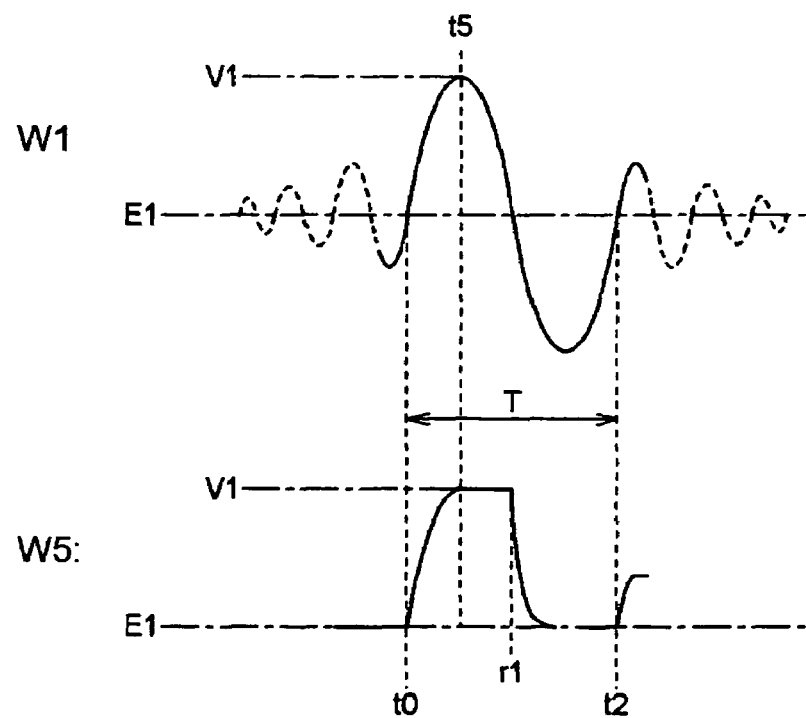
FIG. 9 represents a waveform chart for explaining a signal processing performed by the accentuating means illustrated in FIG. 8.

Another circuit configuration can be employed alternatively for accentuating or detecting the peak of the sensor output (waveform W1) of the sinusoidal wave. FIG. 8 represents a diagram illustrating another example of a circuit configuration of the accentuating means 4 employed in the second and third configuration examples. FIG. 9 represents a waveform chart for explaining a signal processing performed by the accentuating means 4. As illustrated in FIG. 8, the accentuating means 4 is configured from a peak hold circuit. The peak hold circuit includes an operational amplifier 42, a diode D, a capacitor C for maintaining voltage. The peak hold circuit keeps maximum voltage measured relative to the voltage E1, which is the amplitude center of the waveform W1 of the sensor output of the sinusoidal wave, as a reference voltage. As illustrated in FIG. 9, as the voltage of the waveform W1 sinusoidally oscillating about an oscillation center voltage E1 rises toward a positive amplitude direction from the time t0, the waveform W5, which is output of the peak hold circuit, also rises. When the waveform W1 reaches the peak voltage V1 at the time t5, the peak hold circuit keeps outputting the voltage V1. As described above, using a peak hold circuit of simple circuit configuration, the peak of the sensor output (waveform W1) of the sinusoidal wave can be accentuated almost without delay from the time when the sensor output becomes maximum.

In addition, because the peak hold circuit keeps the maximum value, even when accentuation of a peak of the sinusoidal wave in one cycle is completed, the peak hold circuit continues to keep the maximum value. Accordingly, the peak hold circuit includes a reset circuit R for discharging the capacitor C. The reset circuit R is configured from an analog switch so called a transfer gate, or the like. The analog switch is switched on the basis of control signals transmitted from a control circuit (not illustrated). Timing of switching can be set to the time on or after the time t5 when the peak is detected while the peak voltage is kept in sufficient duration of time, or the time when the sensor output (waveform W1) becomes smaller than the amplitude center, or the like. In FIG. 9, the reset operation is performed for discharging the capacitor C at the time r1 when the sensor output (waveform W1) becomes smaller than the voltage E1 (the amplitude center) while the peak voltage V1 is maintained.

In addition, because the accentuating means 4 has an object for accentuating or detecting the peak of the amplitude of the sinusoidal waveform W1 of the sensor output, the accentuating means 4 automatically evaluates the crest value of amplitude. In the embodiment, the signal processing system for a sensor judges whether the event to be detected has occurred on the basis of a frequency of the sensor output of the sinusoidal wave. However, focusing not only on a frequency but also on an amplitude, in other words, the level of the sensor output, enables more accurate judgment whether the event to be detected has occurred. Accordingly, the accentuating means 4 and the determining means 5 referred later can be also considered as an amplitude-detecting means which detects the amplitude of the sensor output, in other words, the crest value of the sensor output.

Next, the determining means 5 will be explained with reference to drawing figures. The determining means 5 determines a time when the sinusoidal waveform W1 of the sensor output has accentuated by the accentuating means 4. When the comparator illustrated in FIG. 7 is employed for the accentuating means 4. As illustrated in FIG. 5, the pulse of narrower width rises at the time t3, and falls at the time t4. Accordingly, by inputting the signal of the waveform W3 into an edge detector such as a flip-flop and a multi vibrator, a time measurement circuit in which timers or the like are combined together, or a microcomputer or the like, the peak time t5=(t3+t4)/2 can be calculated.

In addition, when the peak hold circuit illustrated in FIG. 8 is employed for the accentuating means 4, the peak time t5 can be obtained by comparing the waveform W5 and the waveform W1 by means of a comparator or the like and by detecting that the waveform W1 starts descending from the peak and becomes smaller than the holding peak value.

Figure 10:
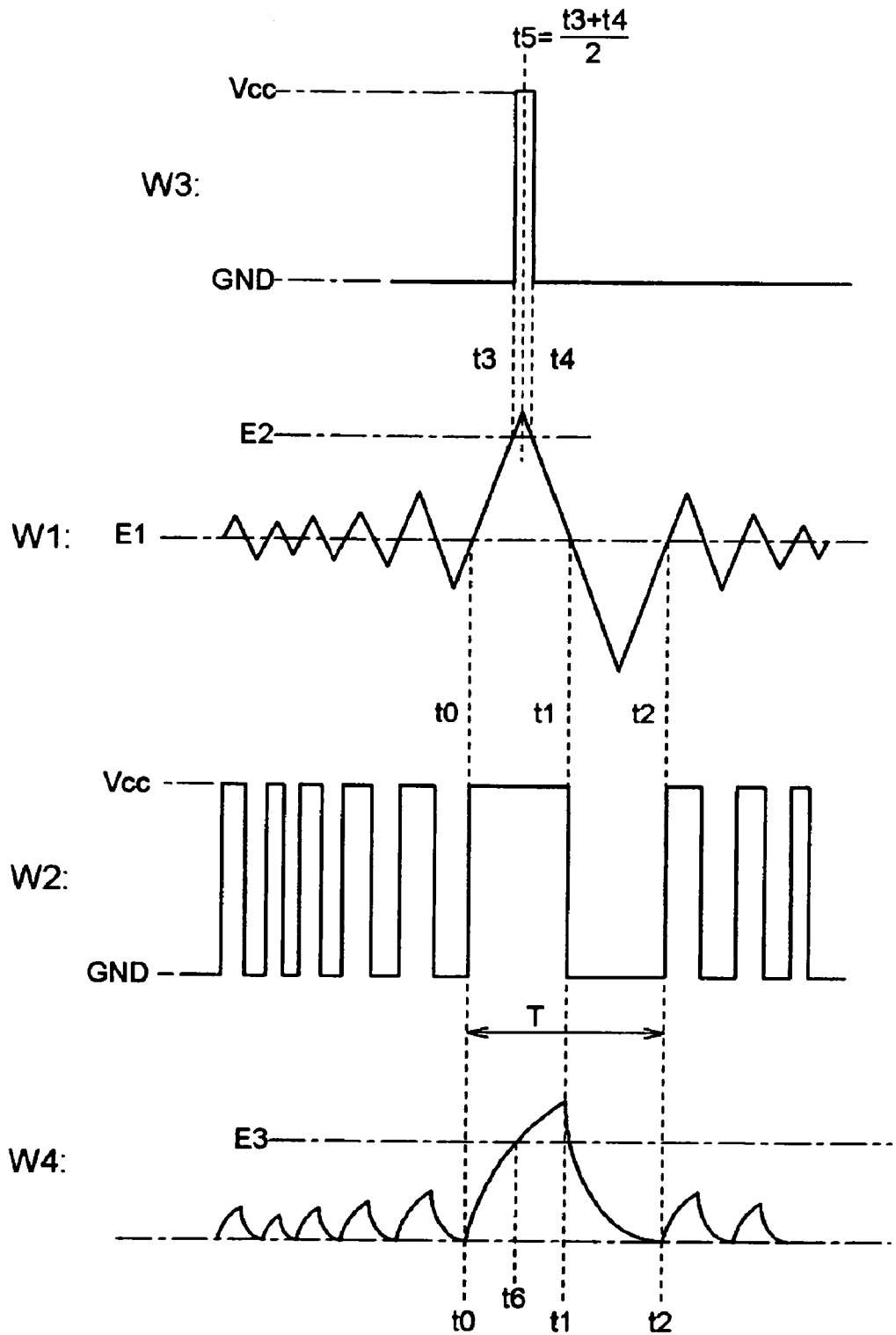
FIG. 10 represents a waveform chart for explaining a second example of the signal processing according to the first to third configuration examples.

As illustrated in FIG. 2 and FIG. 3, output signals transmitted from the converting means 2 is also inputted to the determining means 5. Accordingly, as illustrated in FIG. 10, time difference t5-t0 between the time t5 of the peak obtained on the basis of the output from the accentuating means 4 and the time t0 when the output pulse (waveform W2) of the converting means 2 rises, in other words, one fourth of the time period T can be obtained. Then, on the basis of the one fourth of the time period T, the time period T of the sensor output W1 or the frequency thereof corresponding to the time period T can be determined.

Next, the judging means 6 will be explained. The judging means 6 receives the outputs transmitted from the presuming means 3 and/or the determining means 5 described above, and judges whether the event to be detected has occurred. The judging means 6 is configured from a logic circuit, a microcomputer, or the like. The judging means 6 judges whether the event to be detected has occurred on the basis of the frequency of the sensor output presumed by the presuming means 3, or the frequency or the amplitude of the sensor output determined by the determining means 5.

By configuring each means described above as illustrated in the first to third configuration examples, a preferable signal processing system can be obtained. According to the embodiment of the present invention, a signal processing system for a sensor, which can analyze a sensor output for judging whether an event to be detected has been occurred and recognizing the event to be detected on the basis of a frequency of the sensor output in short time, can be provided.

Figure 11:
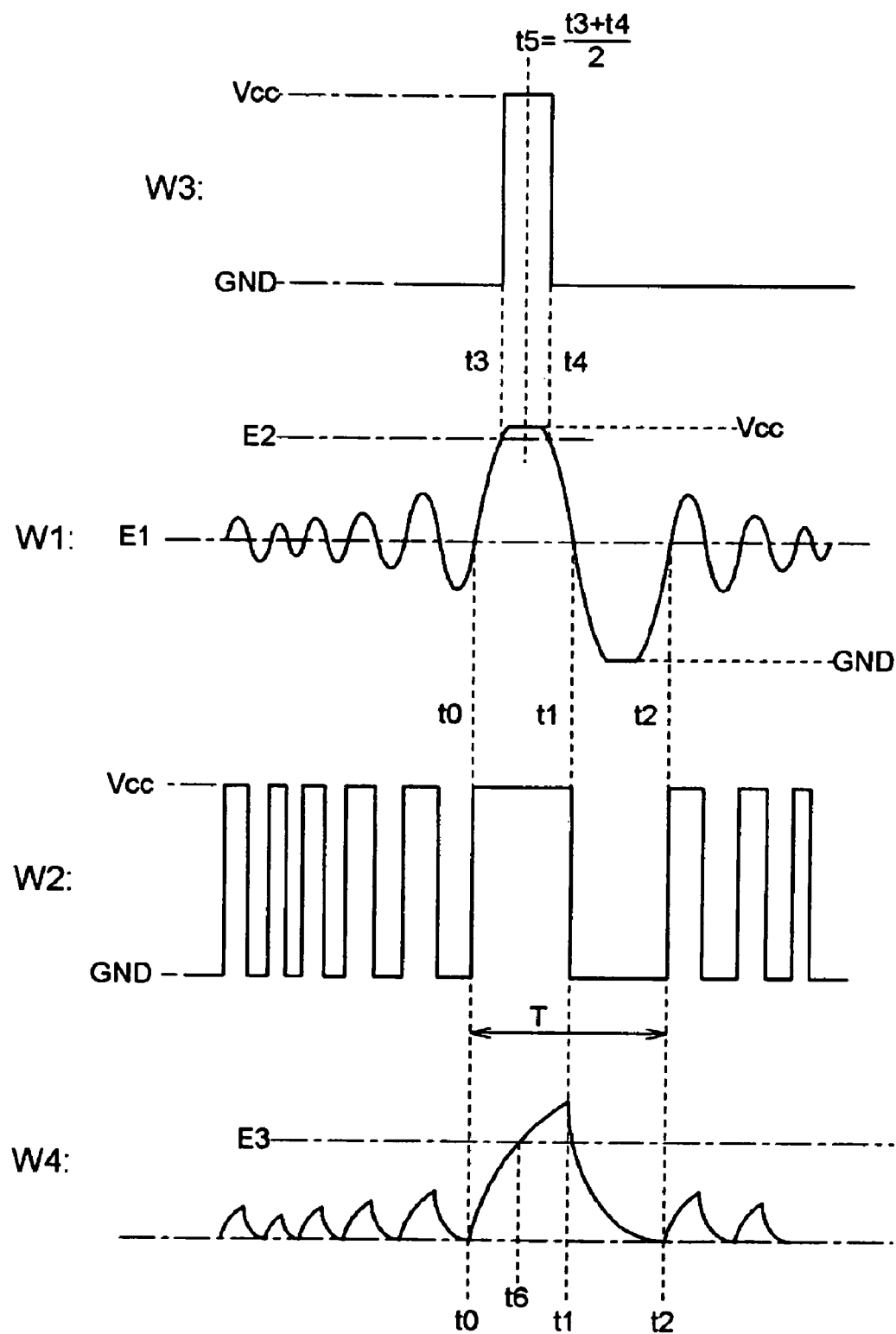
FIG. 11 represents a waveform chart for explaining a third example of the signal processing according to the first to third configuration examples.

Next, second and third examples of a signal processing according to the first to third configuration examples will be explained. In the embodiment described above, for simplifying explanation, a periodically oscillating sensor output is explained as a sinusoidal waveform. However, the term sinusoidal waveform is not limited to a sinusoidal wave itself like illustrated in FIG. 5 and FIG. 9. The term sinusoidal wave can include a distorted wave complicated from plural sinusoidal waves of different frequencies overlapped together, or the like. In addition, as mentioned in the explanation for the converting means, in the embodiment described above, the signal input portion is omitted. Accordingly, a filter circuit, an initial amplifier, and another circuit configuring the signal input portion sometimes makes so called a triangular wave, or a waveform of which higher part is clipped. For example, square wave signals transmitted from a rotational sensor and transmitted through an integration circuit in order for removing high frequency noise can be formed into a triangular wave (illustrated in FIG. 10). In addition, depending on a source voltage of the amplifier, when the sensor output is too large, the higher part of the waveform is sometimes clipped (illustrated in FIG. 11). However, as illustrated in FIGS. 10 and 11, similar signal processing illustrated in FIGS. 5 and 9 can be applied to any waveforms such as the triangular wave and the clipped waveform. And the signal processing system according to the embodiment of the present invention can be applied. In addition, through not illustrated, the signal processing system according to the embodiment of the present invention can be applied to the case in which a sensor output of a square wave periodically oscillating in an arbitrary amplitude is converted into another square wave oscillating between the source voltage and ground with referencing the amplitude center as a threshold.

Figure 12:
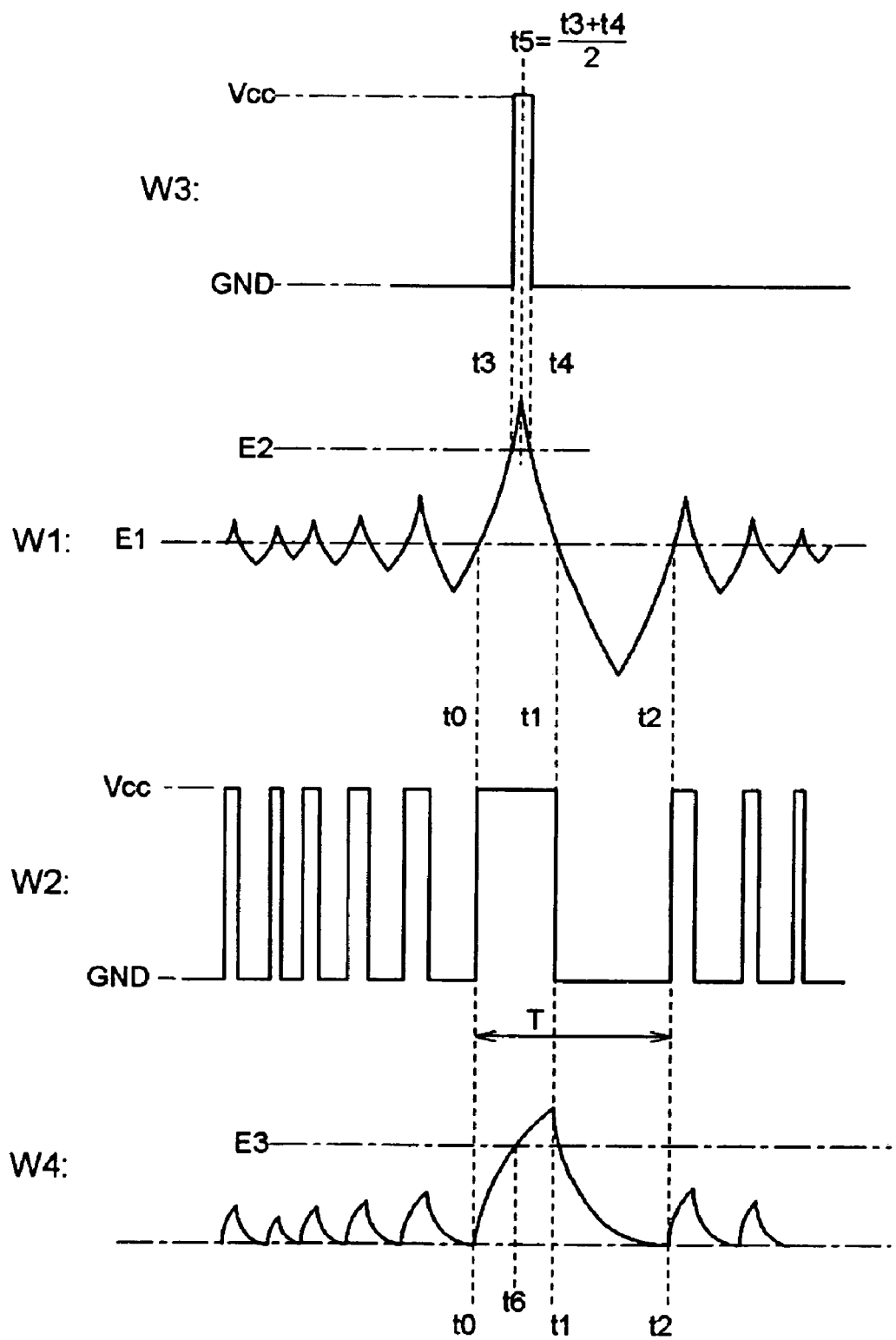
FIG. 12 represents a waveform chart for explaining a fourth example of the signal processing according to the first to third configuration examples.

Next, fourth example of the signal processing according to the first to third configuration examples will be explained. As illustrated in FIG. 12, the waveform of the sensor output can be a waveform periodically oscillating and being point asymmetrical about the amplitude center. In actual, in a piezoelectric sensor system described later or the like, from considerations about a noise level varying from the setting location, a noise filter or the like is sometimes connected into a signal path. As a result, the periodical waveform of the sensor output sometimes oscillates and becomes point asymmetrical about the amplitude center not like so called a sinusoidal wave or a triangular wave.

However, the embodiment of the present invention can be applied to such waveforms without adverse effects. Details will be omitted because of the similarity to the embodiment of the present invention. In following, with reference to FIG. 12, flow of signal processing will be briefly explained.

As illustrated in FIG. 12, the waveform W1 of the sensor output periodically oscillates and is point asymmetrical about the amplitude center, not like a sinusoidal wave or a triangular wave. A reference (threshold) voltage E1 for converting the waveform W1 into the square wave is determined to an amplitude center, in other words, approximate center of maximum and minimum of waveform height. A duty ratio of the waveform W2 of the square wave converted from the waveform W1 of the sensor output does not become 50%. However, the converting means 2 converts the sensor output into the waveform W2 of the square wave while maintaining frequency information (time period T). Accordingly, frequency information is maintained in the duty ratio of the time period T also. The pulse width of the waveform W2 of the square wave is maintained to be proportional to the sensor output. The asymmetry of a waveform of the sensor output about the amplitude center can be known in advance at the designing or refining stage of the sensor system. Further, the reference (threshold) voltage E1 for converting into the waveform W2 of the square wave can also be already known at the designing or refining stage of the sensor system. Accordingly, the duty ratio can already be a known value. Accordingly, for example, when an integrator 31 having a time constant corresponding to a pulse width of the waveform W2 of the square wave is included in the presuming means 3, the waveform W4, which can be utilized to presume the time period (frequency) of the sensor output, can be obtained.

In addition, because a phase shifting of the peak portion rarely occurs, the peak portion accentuated by the accentuating means 4 can be correctly detected independently of symmetry of the sensor output as illustrated in FIG. 12. The accentuating means 4 can be configured from a comparator 41 illustrated in FIG. 7 or a peak hold circuit illustrated in FIG. 8 or the like. The converting means 2 converts the waveform W1 of the sensor output into the waveform W2 of a square wave while maintaining frequency information of the waveform W1 of the sensor output. The converting means 2 has a function for specifying the time t0 when the waveform W1 of the sensor output is at the start point of the time period. Then, the determining means 5 determines approximate one fourth of the time period of the sensor output on the basis of difference between the time t5 of the peak and the time t0. In the case that the waveform W1 does not have symmetry about the amplitude center, the difference cannot be considered as an approximate one fourth of the time period of the sensor output. However, asymmetry of the sensor output and the reference voltage E1 for converting the sensor output into a square wave can be already known when the sensor system is designed or refined as described above. Accordingly, as same as the duty ratio, a ratio between the time difference between the time t5 and the time t0 and the one fourth of the time period becomes a known value. Accordingly, the approximate one fourth of the time period of the sensor output can be calculated utilizing the ratio as a compensation coefficient. Then, the frequency of the sensor output can be determined.

Next, examples of applications of the signal processing system will be explained. The signal processing system according to the embodiment of the present invention can be applied to sensors for detecting various kinds of events. In following, an example of an application will be explained in which the signal processing system according to the embodiment of the present invention is applied to a piezoelectric sensor system including a piezoelectric sensor which detects force induced by shock or vibration and outputs voltage signal on the basis of the detected force. A piezoelectric sensor is a sensor utilizing electric polarization caused by piezoelectric effect of material. The piezoelectric sensor detects applied external force on the basis of a frequency and a level of the oscillating voltage signal generated by electric polarization such as a sinusoidal wave or a triangular wave (including a distorted waveform). Fundamental configuration of the piezoelectric sensor is as follows; the piezoelectric body is sandwiched by two electrodes, and voltage between the electrodes is measured. In addition, the piezoelectric sensor can be configured like a cable from compounded a powder of a piezoelectric ceramic having piezoelectric effect and a resin or the like. The piezoelectric sensor is a convenient sensor, which requires only simple signal circuit configuration, and a voltage output generated by external pressure on the basis of vibration or shock or the like, fundamentally need to be processed.

As described above, because the piezoelectric sensor has simple configuration and good mass-productivity, the piezoelectric sensor can preferably be applied to an opening/closing apparatus such as a sensor for a pinch-detecting apparatus for detecting that an object is pinched by an automatic door or a slide door of a vehicle. Conventionally, a pressure-sensitive sensor of contact detection type is generally applied for such pinch-detecting apparatus. The pressure-sensitive sensor of contact detection type, described in FIGS. 1 to 3 of JP3300660B2, includes a long tube made of elastic material and plural spiral conductive wires serving as electrodes provided inside the outer skin portion of the long tube. When pressing force is applied to the tube, the tube is crushed and some of the conductive wires or all of the plural conductive wires contact one another. Then, pinch can be detected by detecting conduction between the conductive wires.

The pressure-sensitive sensor of contact detection type have some restriction in relation to a degree of freedom for attaching, for example, a degree of bending the sensor or a level of pressure for attaching the sensor, which is inconvenient in particular in such a case that the sensor is disposed along a door frame.

On the other hand, a piezoelectric sensor system can preferably be employed for a pinch-detecting sensor without showing such inconvenience as in the pressure-sensitive sensor described above. In other words, because the piezoelectric element generates electric polarization in accordance with external force (stress), the piezoelectric element can be disposed to various locations with regardless of mounting. In addition, because the piezoelectric element generates voltage even when applied external force is weak in such a case as an initial stage of pinch, pinch can be detected quickly.

In the case that the piezoelectric sensor is installed to an automatic door of a building, the piezoelectric sensor generates voltage on the basis of not only pinch of an object but also vibration of ground induced by a person passing through by the automatic door. In addition, in the case that the piezoelectric sensor is installed to a door of a vehicle, the piezoelectric sensor generates voltage on the basis of vibration induced by running of the vehicle or idling of an engine. However, voltage oscillation induced by such vibrations generally has higher frequency. On the other hand, voltage oscillation induced when an object is pinched by a door has generally lower frequency of approximately 10 Hz. Accordingly, by selecting a frequency band of the sensor output required for the determining a frequency of the pinch-detection, detecting the selected frequency band of the sensor output, and a pinch of an object, which is the event to be detected, can be detected. In addition, strength of a signal emitted when an object is pinched is generally higher than strength of a signal induced by vibrations or the like.

Accordingly, if signal strength is utilized for determination together with frequency, in other words, if amplitude of the sensor output of a sinusoidal wave or the like periodically oscillating in an arbitrary amplitude is utilized for determination, more accurate pinch detection becomes available.

In addition, electromagnetic noise of further higher frequency (kHz-MHz band) is sometimes overlapped with frequency of pinch-detection. However, as described above, generally, as a signal input portion to which signals from a sensor is transmitted, a filter circuit for reducing noise element or an amplifier circuit so called an initial stage amplification of low gain is provided. In the piezoelectric sensor system according to the embodiment, such signal input portion is provided. In explanations of the first to third configuration examples of the signal processing system according to the embodiment of the present invention, in the case that the signal input portion is employed, the signal input portion is provided between the sensor 1 and the converting means 2. This is also applied to the case that the piezoelectric sensor is utilized as the sensor 1.

Details of the signal processing are similar to the embodiment described above (first to third configuration examples). In the case of the pinch-detecting sensor, because early detection of pinch condition is particularly desired, application of the signal processing system according to the embodiment of the present invention is preferable. In addition, the pinch-detecting sensor utilizing the piezoelectric sensor detects a pinch of an object on the basis of a level and a frequency of an output of the piezoelectric sensor. The signal processing system according to the embodiment of the present invention essentially has a function for detecting frequency of the sensor output. Then, function for determining an output level of the sensor is provided at another part. However, in the case that the accentuating means 4 is provided as in the second or third configuration example, as described above, amplitude (a level of the sensor output) can be utilized for judging. Accordingly, there is a possibility that the signal processing system not separately having a function for judging a level of the sensor output can perform satisfactorily.

Further, in the case that the pinch-detecting apparatus is configured from the signal processing system described in the third configuration example, the pinch-detecting apparatus can have a function (the presuming means 3, the accentuating means 4 and the determining means 5) for detecting plural frequencies. Then, frequency can be detected by each means at different time. Accordingly, different control can be performed at each time. For example, on the basis of detection results of the pinch-detecting apparatus, a control apparatus can control the opening/closing apparatus stepwise as follows; the control apparatus decelerates opening/closing speed of the opening/closing apparatus on the basis of a detection result detected at the time of one fourth of the time period, and the control apparatus stops or inverts the opening/closing of the opening/closing apparatus on the basis of a detection result detected at the time of half of the time period.

In addition, the piezoelectric sensor has dependence on temperature. A piezoelectric body configuring the piezoelectric sensor, in other words, material having piezoelectric effect, for example, crystal of quartz, lead zirconate titanate, barium titanate, or the like, also generally has pyroelectric property. Pyroelectric property is a property that temperature change induces electric polarization. Accordingly, a level or frequency of an output of the piezoelectric sensor changes in accordance with ambient temperature. In addition, in the case that the piezoelectric sensor is formed into a cable-like shape, the piezoelectric body is generally formed as a piezoelectric body layer compounded a resin and a piezoelectric ceramic. Accordingly, caused by hardness change of the piezoelectric body layer containing resin in accordance with surrounding temperature change, conditions of the piezoelectric sensor for receiving the applied external force sometimes become different, which tends to cause fluctuations of the sensor output.

For canceling or compensating such temperature dependence, for example, the threshold voltage E2 set in the accentuating means 4 or the time constant of the presuming means 3 can be controlled in accordance with surrounding temperature. For example, resistors of a voltage divider for determining the threshold voltage E2 or a resistor of a time constant circuit can be configured from a resistive body of which resistance value is varied in accordance with temperature, such as a thermistor. There are two kinds of thermistor: thermistor having positive temperature coefficient and a thermistor having negative temperature coefficient. Resistivity of a thermistor having positive temperature coefficient rises in accordance with temperature rise of surroundings. Resistivity of a thermistor having negative temperature coefficient descends against temperature rise of surroundings. Further, there are some kinds of thermistor of which resistivity changes linearly or logarithmically. Accordingly, the thermistor can preferably be applied to each means according to the embodiment of the present invention because a thermistor having characteristics on temperature required for each means can be easily found from those various kinds of thermistors.

Further, because the thermistor is made of material similar to that of a piezoelectric body such as barium titanate, matching composition of the thermistor to that of the piezoelectric body would yield more effective temperature compensation. It is needless to say that the temperature compensation can also be performed as follows without utilizing a thermistor. By matching temperature characteristics of resistors to that of the piezoelectric body, or by composing a capacitor of a time constant circuit from an element having resistance or capacitance parameter changing in accordance with temperature change.

In regard to temperature compensation, a sensor system in which a piezoelectric sensor was utilized was explained as an example. However, it is not limited. The temperature compensation described above can be widely applied to a signal processing system of a sensor for judging whether an event to be detected has occurred on the basis of a frequency of a sensor output transmitted from a sensor having temperature dependence.

The embodiment of the present invention can be applied to a piezoelectric sensor system having a piezoelectric sensor, which detects force generated by shock or vibration and outputs voltage signal of a sinusoidal wave as a sensor output. Further, the embodiment of the present invention can be applied to a pinch-detecting apparatus having the piezoelectric sensor system for detecting a pinch of an object by an opening/closing apparatus as an event to be detected.

According to an aspect of the present invention, a signal processing system for a sensor for judging whether an event to be detected has occurred on the basis of a frequency of a sensor output includes a converting means for converting the sensor output into a square wave, a presuming means for presuming whether the frequency of the sensor output is lower than a predetermined frequency referred for judging whether the event to be detected has occurred on the basis of an output from the converting means, and a judging means for judging whether the event to be detected has occurred on the basis of an output from the presuming means.

For example, when the sensor output is an oscillating wave such as a sinusoidal wave and a triangular wave, the sensor output converted into a square wave at the amplitude center as a reference has a duty ratio of approximately 50%. A frequency of the sensor output can be detected within a half of the time period by measuring the pulse width of the square wave. Further, the presuming means can presume the frequency of the sensor output whether to be lower or higher than a predetermined frequency. In other words, the converting means converts the sensor output into the square wave while maintaining frequency information of the sensor output, which enables to presume the frequency of the sensor output. The signal of the square wave can be considered as a digital signal, indicating information by 1 and 0. Accordingly, the signal can be processed by a digital signal processing means of a microcomputer or the like, which widens possibility of applicable means for presuming the frequency. Then, on the basis of the presuming results, the event to be detected can be judged within a time shorter than one cycle of the sensor output. When the periodically oscillating sensor output has extremely low frequency, for example approximately 10 Hz, the time period of the sensor output is 100 millisecond. In this case, considering that the time taken for judging can be shortened by a half of the 100 millisecond, the time can be shortened by 50 millisecond. As described above, according to the aspect of the present invention, a time for detection speed of the sensor can be improved. Thus, the detection time can be shortened by increase of the detection speed, which is important property for a sensor.

Further, even when the sensor output is not a waveform of a simple shape such as a sinusoidal wave, effects described above can be sufficiently obtained. For example, the sensor output can be a waveform periodically oscillating and being asymmetry about the amplitude center. In this case, the square wave converted from the waveform of the sensor output at the amplitude center as a reference, approximate center between maximum and minimum of a height of the sensor output, does not always have a duty ratio of 50%. However, the sensor output becoming such a waveform can be known in advance at designing or refining stage of the system. Further, because the pulse width of the square wave converted from the waveform of the sensor output is proportional to the frequency of the sensor output, by measuring the pulse width, the frequency (time period) of the sensor output can be presumed. Though judging time sometimes become after half of the time period depending on the duty ratio, the judging time does not become longer than one cycle of the time period.

According to a further aspect of the present invention, a signal processing system for a sensor for judging whether an event to be detected has occurred on the basis of a frequency of a sensor output includes a converting means for converting the sensor output into a square wave, an accentuating means for accentuating a peak portion of the sensor output, a determining means for determining the frequency of the sensor output on the basis of outputs from the converting means and the accentuating means and for determining whether the frequency of the sensor output is lower than a predetermined frequency referred for judging whether the event to be detected has occurred, and a judging means for judging whether the event to be detected has occurred on the basis of an output from the determining means. It is preferable that the determining means determines the frequency of the sensor output by detecting the peak portion of the sensor output on the basis of the output from the accentuating means and by calculating a one fourth of the time period of the sensor output on the basis of a time difference between the time when the peak portion is detected and the time when the square wave transmitted from the converting means rises.

For example, converting the sensor output of an oscillating waveform such as a sinusoidal wave or a triangular wave into a square wave at the amplitude center enables to specify a start time of transition of the sensor output from the amplitude center toward a positive value. In other words, the converting means converts the sensor output into the square wave while maintaining the frequency information of the sensor output. Accordingly, start time of the time period can be determined. On the other hand, the accentuating means for accentuating the peak portion of the sensor output enables to specify time when the sensor output reaches the positive peak of the amplitude. Then, on the basis of the outputs from the converting means and the accentuating means, the determining means enables to know time from when the amplitude of the oscillating sensor output is zero (amplitude center) to when the amplitude becomes maximum, in other words, one fourth of the time period of the sensor output. Accordingly, one cycle of the period (frequency) can be calculated on the basis of the one fourth of the time period. Then, it can be determined that the calculated frequency is lower or higher than the predetermined frequency. In other words, whether the event to be detected has occurred can be judged on the basis of the sensor output within time slightly longer than the one fourth of the predetermined time period. As described above, for example, when the sensor output periodically oscillates at low frequency such as 10 Hz, time of one cycle is 100 milisecond. In this situation, approximately three fourths of 100 milisecond can be cut. According to the aspect of the present invention, detection speed of the sensor system can be improved.

Also in the aspect of the present invention, the sensor output can be a waveform periodically oscillating and being asymmetry about the amplitude center. In particular, in the aspect of the present invention, displacement of the peak portion is extremely rare. Accordingly, it can be sufficient only if a relation to the rise time of the square wave converted by the converting means is taken into consideration. Thus, approximate one fourth of the time period of the sensor output can be calculated, and the frequency of the sensor output can be determined.

According to a further aspect of the present invention, a signal processing system for a sensor for judging whether an event to be detected has occurred on the basis of a frequency of a sensor output includes a converting means for converting the sensor output into a square wave, a presuming means for presuming whether the frequency of the sensor output is lower than a predetermined frequency referred for judging whether the event to be detected has occurred on the basis of an output from the converting means, an accentuating means for accentuating a peak portion of the sensor output, a determining means for determining the frequency of the sensor output on the basis of outputs from the converting means and the accentuating means and for determining whether the frequency of the sensor output is lower than a predetermined frequency referred for judging whether the event to be detected has occurred, and a judging means for judging whether the event to be detected has occurred on the basis of outputs from the presuming means and the judging means. Here, it is preferable that the determining means detects the peak portion of the sensor output on the basis of the accentuating means, calculate the one fourth of the time period of the sensor output on the basis of time difference between the detected peak portion and rising of the square wave transmitted from the converting means, and determine the frequency of the sensor output.

For example, when the sensor output is an oscillating waveform such as a sinusoidal wave and a triangular wave, by converting the sensor output into a square wave about the amplitude center, time when the amplitude of the sensor output starts transiting from the amplitude center toward positive amplitude can be specified. Further, because the square wave has a duty ratio of approximately 50%, by measuring the pulse width, the frequency of the sensor output can be presumed within a half of the time period. In other words, because the converting means converts the sensor output into the square wave while maintaining the frequency information of the sensor output, start time of the time period can be specified. Further, the frequency can be presumed. On the other hand, the accentuating means for accentuating the peak portion of the sensor output enables to specify time when the sensor output reaches a positive peak of the amplitude. Then, on the basis of the outputs from the converting means and the accentuating means, the determining means enables to obtain time from when the amplitude of the oscillating sensor output is zero to when the amplitude becomes maximum, in other words, the one fourth of the time period of the sensor output. Then, on the basis of the presumed time period, whether the frequency of the sensor output is lower or higher than the predetermined frequency can be presumed. Further, by calculating one cycle of the time period (frequency) on the basis of the one fourth of time obtained from the specified time when the sensor output starts transiting from the amplitude center and the time of the peak portion of the amplitude, whether the frequency of the sensor output is lower or higher than the predetermined frequency can be determined. Then, on the basis of these presuming results and determination results, whether the event to be detected has occurred can be judged within a shorter time than one cycle of the time period of the sensor output. As described above, when the frequency of the oscillating sensor output is extremely low such as 10 Hz, one cycle of the time period is 100 millisecond. In this situation, detection of whether the event to be detected has occurred within a time approximately half or one fourth of one cycle of the time period has large effect for saving time. Further, when whether the event to be detected has occurred is judged each of at the one fourth, at the half, at the one cycle of the time period, the event to be detected can be judged on the basis of different judgment basis at each time. Accordingly, risk of detection error can considerably be reduced. Further, in the situation that other apparatus is controlled on the basis of the detection of the event to be detected, different content of control can be set at each judging time. As a result, stepwise control becomes possible such that the apparatus is decelerated at the one fourth of the time period, stopped at the half of the time period, and operates an informing means such as alarm or the like at the one cycle of the time period. Further, the sensor output can be such a waveform periodically oscillating and asymmetry about the amplitude center of the sensor output. In this situation, the square wave converted from the waveform of the sensor output by the converting means does not have a duty ratio of approximately 50% sometimes. It is normally known at the designing or refining stage of the system that the converted waveform becomes such shape. Further, because the converting means converts the sensor output into the square wave while maintaining the frequency information of the sensor output, the pulse width of the converted sensor output is proportional to the time period of the sensor output obviously. Accordingly, by measuring the pulse width, the frequency (time period) can be presumed. In dependence upon the duty ratio, there are some cases that the determining time becomes later than the half of the time period. However, it is preferable that the determining can be conducted within one cycle of the time period. Further, because displacement of the peak portion is rare, considering only a relation to rise time of the square wave converted by the converting means is sufficient for calculating the one fourth of the time period of the sensor output and determining the frequency of the sensor output.

According to a further aspect of the present invention, the presuming means includes an integrator for integrating the output from the converting means and a comparator having a threshold value which can be exceeded by an output waveform from the integrator before the output waveform reaches a peak thereof in the case that the frequency of the sensor output is lower than the predetermined frequency, and the presuming means presumes that the frequency of the sensor output is lower than the predetermined frequency with referencing that the output waveform from the integrator exceeds the threshold value.

When the time constant is set so that the output from the integrator can reach the maximum amplitude of the square wave converted from the waveform of the sensor output by the converting means, and when the threshold value is set smaller than the maximum amplitude of the square wave, the output from the integrator can exceed the threshold within a time shorter than the pulse width of the square wave. When the pulse width is narrow, in other words, the frequency is high, the output from the integrator can not rise to the threshold value. Accordingly, on the basis of whether the output of the integrator exceeds the threshold, it can be presumed whether the frequency of the sensor output is lower or higher than the predetermined frequency. In this situation, the time constant and the threshold can be set without being constrained into such as the half of the time period, which enables to presume the frequency of the sensor output within a shorter time.

According to a further aspect of the present invention, the accentuating means includes a comparator for converting the sensor output around the peak portion thereof into a pulse of narrow width. Transmitting the sensor output into the comparator having a threshold value slightly smaller than the amplitude of the sensor output yields a narrow pulse of which only near the peak portion is converted into a pulse. Because the middle of the time between the pulse rises and falls becomes the peak time, the peak time can be detected correctly. Further, because the sensor output converted into the square wave by the converting means and the narrow pulse are formed as digitized signals, these outputs can be directly transmitted into a digital signal processing means such as a microcomputer.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the concept of the present invention. Accordingly, it is expressly intended that all such variations, changes and equivalents which fall within the concept and scope of the present invention as defined in the claims, be embraced thereby.

The invention claimed is:

1. A sensor system for judging whether an event to be detected has occurred, comprising:
    a sensor outputting a sensor output whose frequency changes lower when the event has occurred,
    a converting means for converting the sensor output into a square wave;
    a presuming means for presuming whether the frequency of the sensor output is lower than a predetermined frequency on the basis of waveform within one cycle of an output from the converting means; and
    a judging means for judging that the event to be detected has occurred when the presuming means presumes that the frequency of the sensor output is lower than the predetermined frequency.

2. A sensor system according to claim 1, wherein
    the presuming means includes an integrator for integrating the output from the converting means and a comparator having a threshold value which can be exceeded by an output waveform from the integrator before the output waveform reaches a peak thereof in the case that the frequency of the sensor output is lower than the predetermined frequency, and the presuming means presumes that the frequency of the sensor output is lower than the predetermined frequency with referencing that the output waveform from the integrator exceeds the threshold value.

3. A sensor system according to claim 1, wherein the sensor is piezoelectric sensor detecting external force and outputting oscillating voltage signal as the sensor output on the basis of the detected external force, and the judging means judges whether the external force is applied to the sensor.

4. A sensor system for judging whether an event to be detected has occurred comprising:
    a sensor outputting a sensor output whose frequency changes lower when the event has occurred,
    a converting means for converting the sensor output into a square wave;
    an accentuating means for accentuating a peak portion of the sensor output;
    a determining means for determining the frequency of the sensor output on the basis of outputs from the converting means and the accentuating means and for determining whether the frequency of the sensor output is lower than a predetermined frequency; and
    a judging means for judging that the event to be detected has occurred when the determining means determines that the frequency of the sensor output is lower than the predetermined frequency.

5. A sensor system according to claim 4, wherein
    the accentuating means includes a comparator for converting the sensor output around the peak portion thereof into a pulse of narrow width.

6. A sensor system according to claim 4, wherein
    the accentuating means includes a peak hold circuit for retaining a maximum value of the sensor output.

7. A sensor system for judging whether an event to be detected has occurred, comprising:
    a sensor outputting a sensor output whose frequency changes lower when the event has occurred,
    a converting means for converting the sensor output into a square wave;
    a presuming means for presuming whether the frequency of the sensor output is lower than a predetermined frequency on the basis of an output from the converting means;
    an accentuating means for accentuating a peak portion of the sensor output;
    a determining means for determining the frequency of the sensor output on the basis of outputs from the converting means and the accentuating means and for determining whether the frequency of the sensor output is lower than a predetermined frequency; and
    a judging means for judging that the event to be detected has occurred when the presuming means presumes that the frequency of the sensor output is lower than the predetermined frequency and the determining means determines that the frequency of the sensor output is lower than the predetermined frequency.

8. A sensor system according to claim 7, wherein
    the presuming means includes an integrator for integrating the output from the converting means and a comparator having a threshold value which can be exceeded by an output waveform from the integrator before the output waveform reaches a peak thereof in the case that the frequency of the sensor output is lower than the predetermined frequency, and the presuming means presumes that the frequency of the sensor output is lower than the predetermined frequency with referencing that the output from the integrator exceeds the threshold value.

9. A sensor system according to claim 7, wherein
    the accentuating means includes a comparator for converting the sensor output around the peak portion thereof into a pulse of narrow width.

10. A sensor system according to claim 7, wherein
    the accentuating means includes a peak hold circuit for retaining a maximum value of the sensor output.

* * * * *